(12) United States Patent
Gaston (10) Patent No.: US 7,124,441 B1
(45) Date of Patent: *Oct. 17, 2006

(54) METHOD AND APPARATUS FOR SECURELY ASSOCIATING AN OPTICALLY READABLE MEMORY WITH A USER MACHINE

(75) Inventor: Kerry R. Gaston, Montgomery, AL (US)

(73) Assignee: Global Anti-Piracy Systems, Inc., Montgomery, AL (US)

( * ) Notice: Subject to any disclaimer, the term of this patent is extended or adjusted under 35 U.S.C. 154(b) by 867 days.

This patent is subject to a terminal disclaimer.

(21) Appl. No.: 09/721,299

(22) Filed: Nov. 22, 2000

Related U.S. Application Data (63) Continuation-in-part of application No. 09/190,511, filed on Nov. 12, 1998, now Pat. No. 6,609,203.

(51) Int. Cl.
*H04L 9/00* (2006.01)

(52) U.S. Cl. .......................... 726/26; 726/31; 380/201; 380/203; 705/52; 705/57; 365/110; 365/126; 365/127; 369/13.04; 369/112.01; 369/275.2; 369/285; 250/201.5

(58) Field of Classification Search ................ 713/183, 713/193, 176; 380/201–203; 705/57, 52; 369/60, 13.04, 30.04, 112.01, 275.2, 284, 369/285, 45, 100; 365/106, 108, 110, 120–122, 365/124, 126, 127; 250/201.5; 726/26, 726/31

See application file for complete search history.

(56) References Cited

U.S. PATENT DOCUMENTS

| | | | | |
|---|---|---|---|---|
| 5,371,792 A | * | 12/1994 | Asai et al. | 705/59 |
| 5,527,650 A | * | 6/1996 | Yoshinaga et al. | 430/20 |
| 5,596,639 A | | 1/1997 | Kikinis | |
| 5,604,002 A | | 2/1997 | Tsujioka et al. | |
| 5,646,993 A | | 7/1997 | Aizawa | |
| 5,754,649 A | | 5/1998 | Ryan et al. | |
| 5,815,484 A | * | 9/1998 | Smith et al. | 369/275.1 |
| 5,963,536 A | | 10/1999 | Vasic et al. | |

OTHER PUBLICATIONS

Stellato: "Report on CLEO/Pacific Rim '97" Jul. 1987, US Army Research Office Far East, Sec. 3.*

* cited by examiner

*Primary Examiner*—Emmanuel L. Moise
*Assistant Examiner*—Paul Callahan
(74) *Attorney, Agent, or Firm*—Leydig, Voit & Mayer, Ltd (57) ABSTRACT

A CD-ROM has an obscurable section wherein exists a photosensitive mask material layer or constituent operative to alter the optical properties of areas subjected to prolonged exposure to the CD-ROM read laser radiation. Digital information stored on a CD-ROM is made accessible by use of a password, which is generated from user machine unique information, and which is written on the CD-ROM via selective exposure of the CD-ROM to the radiation used to read the CD-ROM.

21 Claims, 6 Drawing Sheets

METHOD AND APPARATUS FOR SECURELY ASSOCIATING AN OPTICALLY READABLE MEMORY WITH A USER MACHINE

RELATED APPLICATIONS

This application is a continuation in part of U.S. patent application Ser. No. 09/190,511, filed on Nov. 12, 1998, now U.S. Pat. No. 6,609,203 entitled "Secure Optically Readable Memory Usable In Conjunction With a Limited Number of Machines," which is hereby incorporated by reference in its entirety.

FIELD OF THE INVENTION

The present invention relates generally to the field of optically readable memory, and more particularly, relates to an optically readable memory that can be made secure and usable in connection with a limited number of machines.

BACKGROUND OF THE INVENTION

CD-ROM discs are capable of storing large quantities of digital information. This information may be program, database, image, music, video, desktop publishing, or other information susceptible to digital storage. The information is generally stored by physical pits and lands situated along a spiral track that is several miles long. The physical pits may be made optically or by direct physical manipulation, but are readable only optically. That a memory is optically readable means herein that the memory is readable through the use of a laser or other light source.

There are generally two alternate methods that may be used to manufacture CD-ROM's with specific information on them. The first of these is "glass mastering", which begins with creation of a first copy of the disc which will be used to create a series of positive and negative copies, which will then be used to press identical copies of the first disc. This method, with possibly only a few exceptions, does not allow for the placement of unique information on any one copy. "CD-R" is an alternative writing process, wherein a layer of organic dye allows the CD-R disc to have a unique set of data recorded on it by a CD-R recorder. Copies made by the CD-R method need not be identical. Rather, each may contain certain unique information. Whichever method is used, each copy of the disc is generally coated with a reflective coating and a clear protective layer after being encoded with information.

Figure 1:
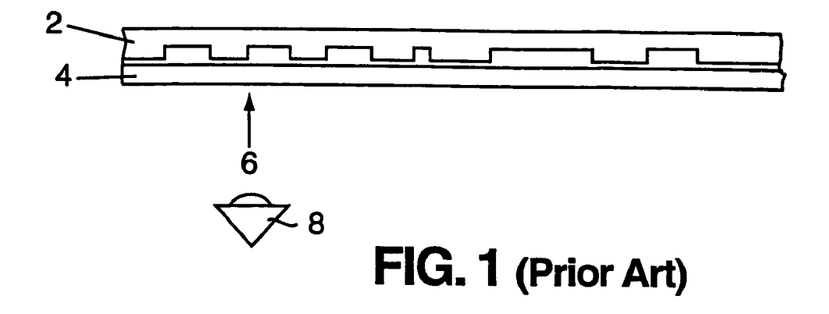
FIG. 1 is a fragmentary sectional side view of a prior art disc, taken along a radius of the disc.

In FIG. 1, there is shown a sectional side view of a prior art disc, taken along a radius of the disc. The data on the disc is represented by the structure 2 imprinted on the disc. As mentioned, the structure 2 representing the data is generally covered by a clear protective coating 4, after being covered by a thin reflective layer which is not depicted in the figures for simplicity. Generally, the information stored on a CD-ROM is read by directing a low-power laser (typically solid-state or HeNe) at the portion of the spiral track containing the information to be read, along the direction 6. Because the pits reflect light differently than the plains or lands between pits, a photodiode or other photosensitive receiver 8 exposed to the reflected light will detect a series of light and dark reflections as the disc spins, which can be converted to a series of 1's and 0's. These 1's and 0's are a digital representation of the information stored on the disc. Generally, to ensure that the pits and lands pass the laser and receptor 8 at the same rate regardless of location, the disc turns at a lower angular velocity as sectors farther from the center are read.

As a high-density storage medium, CD-ROM technology involves the use of channel codes to retrieve the information stored on the disc. Typically, the channel code used is eight-to-fourteen modulation, a method that relies on transitions to signal ones, and the absence of transitions to signal zeros. Because of this high density and resulting high storage capacity, CD-ROM technology has emerged as a superior alternative to floppy disc technology for marketing large application programs or other memory intensive data. Furthermore, the fact that they are an optical rather than magnetic medium makes CD-ROM's impervious to influences that would corrupt a floppy disc. Even the laser that is typically used by a user machine to read a CD-ROM disc is incapable of damaging or writing on the disc. Hence the moniker, ROM or Read Only Memory.

In the past, the inability of user machines to write on CD-ROM's has caused CD-ROM's to be difficult to secure. Once one user had acquired a disc, there was no way to avoid the dissemination of the information on the disc to other users. In light of this problem with CD-ROM's, certain security measures have developed. In one prior art scheme, a CD-ROM is packaged with a companion floppy disc, which is magnetically readable and writeable by the user computer, to be used along with the CD-ROM to access the information on the CD-ROM. The floppy, which contains information necessary to the use of the CD, is copy-protected. However, the security provided by this scheme is compromised by the widespread availability of means to defeat copy protection on floppy discs.

Methods of copy-protecting a CD itself include the method and apparatus claimed by Kikinis as disclosed in U.S. Pat. No. 5,596,639. The invention of Kikinis involves the use of a high-powered laser to damage the physical structure of the disc, in selected areas, to create a password. Drawbacks to this method are readily apparent; the programming of the password onto the disc requires a higher power laser than that used by the user computer. Thus there is no way, using this method, for the information on the disc to indicate whether the disc has been used already. Consequently, although the disc may be copy-protected, it is not protected from use by more than one user computer.

To overcome the drawbacks evident in the prior art, it is desirable to provide an optically readable memory that prevents unauthorized use. For example, it is desirable to provide a CD-ROM that is capable of changing in response to an authorized use in order to block subsequent unauthorized use. To this end, according to an embodiment, the optically readable memory of the present invention is adapted to be permanently altered by a finite number of read cycles, so that a vanishing code located on the disc, usable to access the disc, becomes unreadable. Alternatively, in an embodiment of the invention, the user machine may alter the optically readable memory by writing rather than obscuring security information.

SUMMARY OF THE INVENTION

An object of the present invention is to provide an optically readable memory that is usable in connection with a finite number of user machines. Generally, this object is achieved by providing the optically readable memory with a vanishing code, usable to access information stored on the memory. The vanishing code is digitally written on the optically readable memory and is situated physically adjacent or proximal to an initially translucent mask layer. The mask layer is adapted to cause the vanishing code to become unreadable after at least one and possibly multiple readings by a user machine. In this manner, a user machine that has not already read the vanishing code will be unable to access the information stored on the disc after the vanishing code becomes unreadable.

In an alternative embodiment, a signature is created by manipulating numerical indicators that may be predominantly unique to a user machine. Thereafter, the signature is written to the disc, preventing later access to secured information on the disc via any machine other than a machine which has unique information that yields essentially the same signature initially written to the disc. A distinct aspect of this embodiment is to provide a CD-ROM that is writable using a standard CD-ROM read laser.

The optically readable memory is preferably a CD-ROM, and the mask layer is preferably sensitive to low-power laser radiation such as that emitted by a solid-state or HeNe laser of the wavelength typically used by a user machine to read CD-ROM's. The mask layer is preferably a thin film or substrate positioned on the CD-ROM above the pits and lands representative of the vanishing code, but beneath the standard clear protective layer. In one embodiment, the mask layer preferably becomes permanently altered to render the vanishing code unreadable after a finite number of exposures to the radiation used to read the disc, while in another embodiment, the mask layer may be selectively altered to provide a readable data encoding function.

DETAILED DESCRIPTION OF THE PREFERRED EMBODIMENTS

Figure 2:
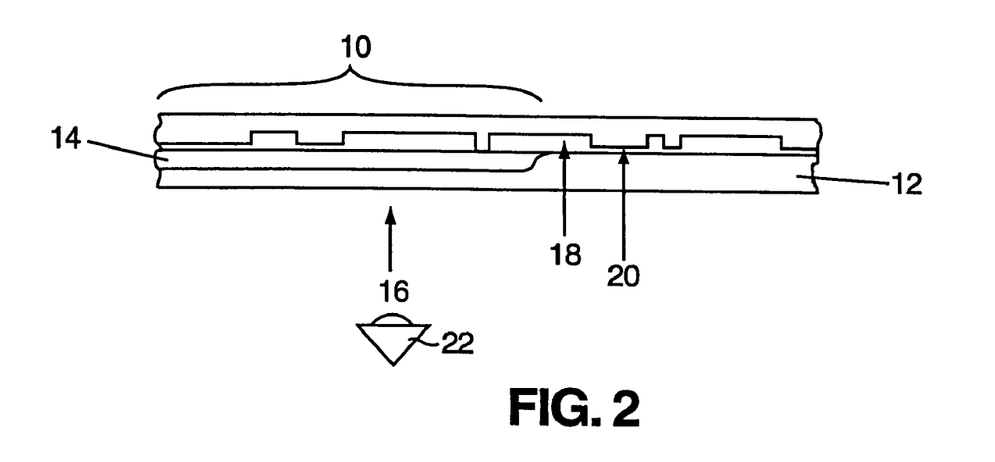
FIG. 2 is a fragmentary sectional side view of a vanishing code portion of a disc according to an embodiment of the present invention, taken along a radius of the disc, wherein the disc has not yet been read by a user machine.

Turning to the figures, wherein like numerals designate like parts, there is shown in FIG. 2 a cross-sectional view of the vanishing code portion of a CD-ROM according to an embodiment of the invention, prior to use. In particular, the CD-ROM includes structure which represents digital data corresponding to a vanishing code 10, a standard clear protective coating 12, and a mask layer 14 disposed beneath the clear protective coating 12. The mask layer 14 may cover the entire vanishing code, or may cover only a portion of the vanishing code. The structure that represents the information and data on the disc may be disposed along a spiral track on the disc, as in the prior art. The vanishing code may be unique to the disc or, preferably, it may be the same for all copies of the same-titled CD-ROM. The laser radiation employed by the user machine's CD-ROM drive to read the disc is directed along line 16. During scanning of the vanishing code region, the laser radiation is transmitted through both the clear protective coating 12 and the mask layer 14, which is transparent prior to use. Upon striking a pit 18, the laser radiation reflects differently than upon striking a land 20. A photodiode or other photosensitive receiver 22 situated to receive reflected or transmitted laser radiation detects the relative strength of reflected or transmitted light. Upon further processing, the detected series of strong and weak reflections or transmissions is converted to a digital series of 1's and 0's, representing the vanishing code. In this manner, the user machine may read and store the vanishing code when first presented with a new disc embodying the present invention. As will be described hereinafter, the vanishing code is preferably usable by the user machine to access the information stored on the CD-ROM. Possibly, the vanishing code is used in conjunction with a hidden code, much as a key is used in conjunction with a lock, to gain access to whatever application or data is stored on the CD-ROM.

The mask layer 14 will now be described in greater detail. The mask layer 14 is depicted and described in an exemplary embodiment as a distinct coating, but may in fact alternatively be an integral part of another layer of the disc pursuant to certain fabrication methods. As will be described, the mask material may darken or become opaque due to photoreaction, or alternatively may change from non-reflective to reflective upon photoreaction. Generally, methods of fabricating the mask layer 14 can be divided into two categories: surface deposition and integral doping/implantation (such as ion implantation). Surface deposition techniques include sputtering, physical or chemical vapor deposition, spin coating, rear-side ablation of organic chromophore, and pulsed laser evaporation. Note that the surface upon which the mask layer is deposited may be the pitted information surface of the disc, or may be the opposite side, or "smooth" side, of the disc, or the reflective layer itself.

Appropriate doping/implantation methods include ion implantation into the typically polycarbonate substrate, either before or after processing, or into the reflective coating or other component, and doping of the disc feedstock used for forming the disc. Doping/implantation methods may be used to alter any of the disc constituent layers, including the substrate and the reflective layer.

Materials suitable for masking via deposition or doping/implantation include photoblendable metal compounds and photodarkenable amorphous compound semiconductor thin films or particles. As one example of a depositable photoreactive coating, a quantum-dot loaded liquid polymer may be spun onto the desired surface of the disc. In an exemplary integral technique, as an alternative to placing photodarkening compounds into the reflective layer, oxygen compounds which are sensitive to light may be placed in the reflective layer, which is typically aluminum. In this way, laser radiation that is incident upon the aluminum will act to release oxygen into the aluminum, causing it to become substantially non-reflective to the laser radiation.

One suitable technique that requires additional processing steps involves the use of ultraviolet conditioning for infrared absorption. In this technique, a light-sensitive coating or constituent (UV chromophores may be deposited on any surface of the disc by way of spin coating, or may be doped or implanted into the disc) is incubated via UV (high-energy) radiation prior to use, such as during manufacture, such that later exposure to infrared (low-energy) radiation activates the material, causing a change in the optical properties of the material. Because the material resides either proximally to or within a layer of the disc, the change in optical properties alters the reflection or transmission of incident read laser radiation. The technique of ultraviolet conditioning for infrared absorption has the benefit of allowing indiscriminate placement of a fairly photo-insensitive mask layer, either within or on a disc constituent, over a large portion of the disc, followed by selective incubation to sensitize only those portions of the disc (the obscurable section) where information is desired to be later written or obscured. Thus, an acceptably small reaction time constant may be selectively provided within the obscurable section without risking inadvertent photodarkening through routine reads of the disc outside of the obscurable section.

Other photodarkenable materials sensitive to infrared (IR) radiation such as that typically used to read CD-ROMs (approximately 780 nm) include silver compounds and chemicals, such as silver soap emulsions, mixtures and solutions. For example, silver soap is the primary ingredient in certain photosensitive films such as DRYVIEW x-ray film produced by KODAK.

Figure 3:
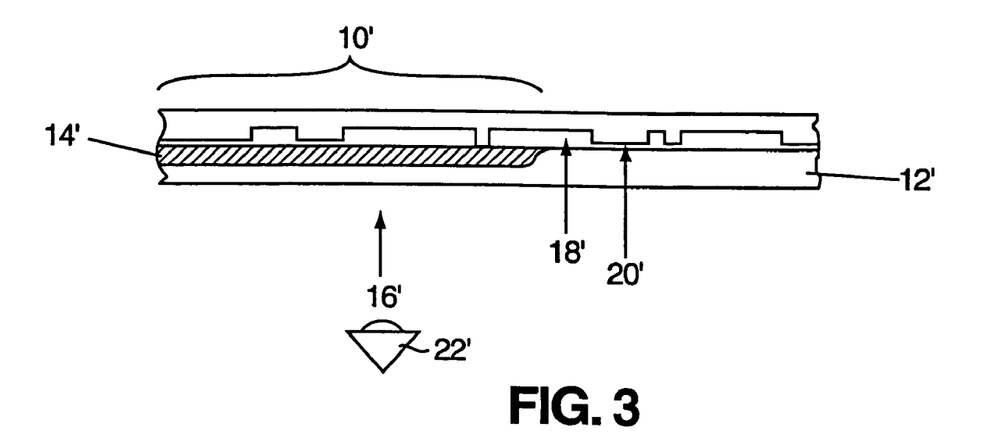
FIG. 3 is a fragmentary sectional side view of the vanishing code portion of a disc according to an embodiment of the present invention, taken along a radius of the disc, wherein the disc has been previously read by a user machine.

FIG. 3 illustrates a cross-sectional view of the vanishing code portion of a CD-ROM according to an embodiment of the invention, after a finite number of scans by the reading laser of the user machine CD-ROM drive. Unlike the mask layer 14 in FIG. 2, the mask layer 14' in FIG. 3 is opaque. This is due to the light-sensitive nature of the mask layer material, which is particularly adapted in this embodiment to become opaque in response to a finite amount of exposure to infrared radiation, the wavelength range of light typically used to read CD-ROM's. When the user machine attempts to read the vanishing code of the CD-ROM in FIG. 3, which code has become obscured by the now opaque mask layer 14', the laser radiation 16' used by the CD-ROM drive of the user machine does not reflect strongly from, or transmit strongly through, the structure 10' which represents the vanishing code. Thus, the vanishing code becomes unreadable, and the information stored in the vanishing code region of the CD-ROM is preferably interpreted as an invalid code. As will be described, a user machine which has not acquired the vanishing code before it has become unreadable will preferably not be able to access the data stored on the CD-ROM of FIG. 3.

Alternatively, the mask layer 14' material may change from non-reflective to reflective upon repeated exposure to optical radiation. In this case, when the user machine attempts to read the vanishing code of the CD-ROM in FIG. 3, which code has become obscured by the now reflective mask layer 14', the laser radiation 16' used by the CD-ROM drive of the user machine reflects from the vanishing code region of the CD-ROM. Thus, the vanishing code becomes unreadable, and the information stored in the vanishing code region of the CD-ROM is preferably interpreted as an invalid code.

Figure 4:
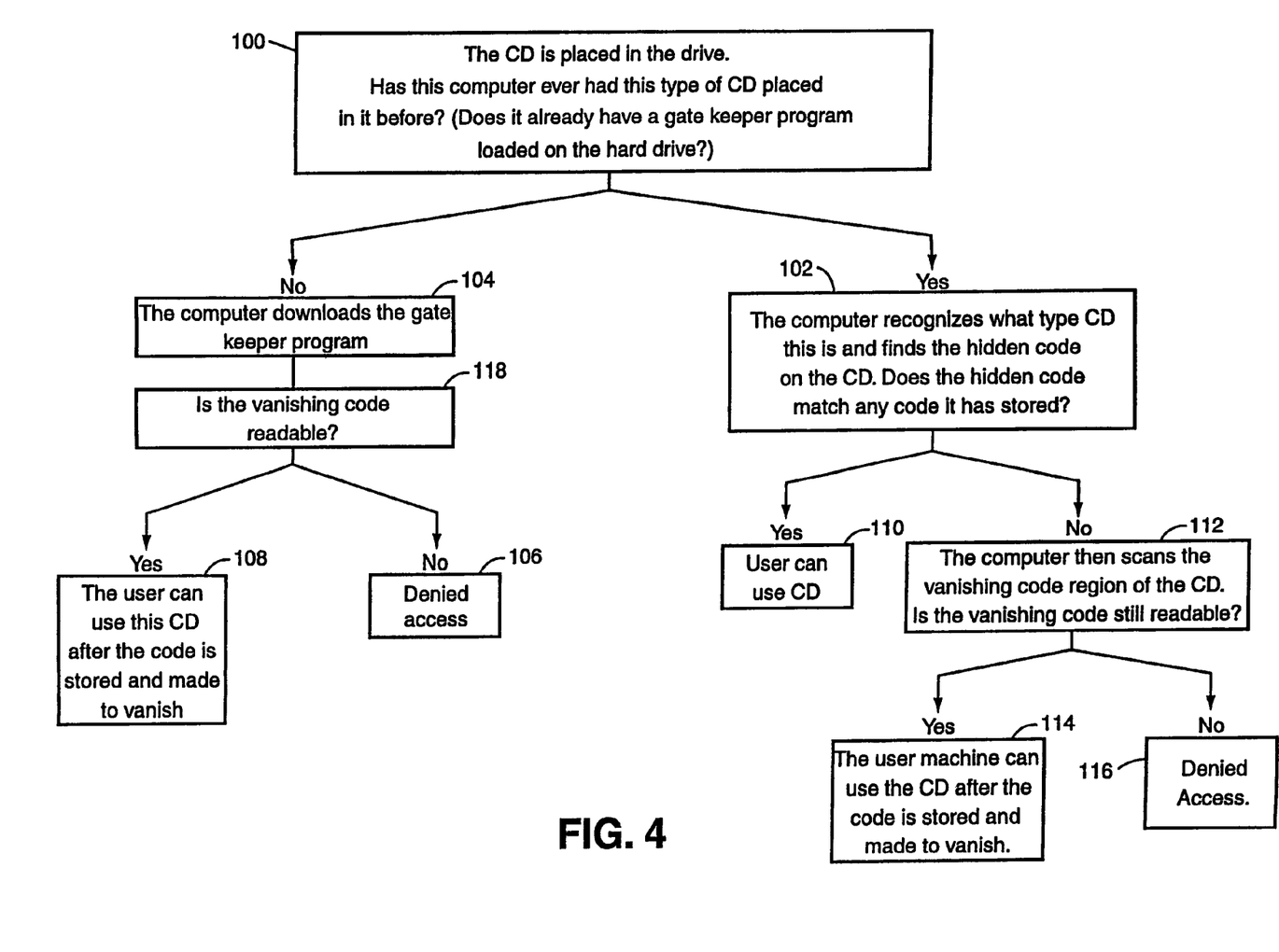
FIG. 4 is a flow chart representing the process used to grant or deny access to the information stored on a CD-ROM in an embodiment of the present invention.

There is shown in FIG. 4 a flowchart of the method according to a preferred embodiment whereby the user machine gains, or is denied, access to the information stored on an optically readable memory. At event 100, the CD-ROM is inserted into the drive of a computer. If the computer has previously used this type of disc, it will have loaded the gatekeeper program from the CD-ROM onto its hard drive. This is because the CD-ROM causes a computer that does not have the gatekeeper program on its hard drive to have the gatekeeper program installed. Thus, if there is no gatekeeper program on the hard drive, then the computer is instructed to load the freely accessible gatekeeper program onto its hard drive from the CD-ROM at event 104.

Once the gatekeeper program is installed and running, it functions to locate the vanishing code region of the CD-ROM and attempts to read the code, event 118. If the code is unreadable, then the gatekeeper program denies the computer access to the encrypted information on the CD-ROM, event 106. If the code is readable, the computer reads and stores it, using it thereafter to gain access to the encrypted information on the CD-ROM, event 108. As described previously, the process of reading the code will render the code unreadable after a finite number of scans by the user machine laser.

If the machine has previously been exposed to this type of disc as evidenced by the initial presence of the gatekeeper program on the hard drive, then the machine, using the gatekeeper program, locates the hidden code on the CD-ROM and compares it to vanishing codes that have previously been stored on the hard drive, event 102. If a match is found, the computer is granted access to the encrypted information on the disc, event 110. If a match is not found, the computer attempts to read the vanishing code, event 112. If the code is not readable, access is denied, event 116. If the code is readable, the computer reads it, permanently stores it in a location used for other codes usable in conjunction with this type of disc, and uses it to access the encrypted information on the disc, event 114. The process of reading the code will render it unreadable after at least one read.

It may often be useful to use the same hidden and vanishing codes for all copies of the same titled disc. In this manner, a user who has previously bought a copy of that disc and used it in their user machine may also use any other copy of the same disc. This would be true even where the other copy has previously been used by another machine rendering the vanishing code unreadable, because the user machine seeking access has already stored the hidden code during use of the first copy of the same titled disc.

In an alternative embodiment, the photosensitivity of regions of the disc is exploited to provide security by encoding rather than obscuring information. For example, with reference to FIG. 5, an entirely reflective portion of the disc 300, 300' may incorporate a photodarkenable component, as in FIG. 5c, or be covered by a photodarkenable material 302, 302' as in FIGS. 5a and 5b. (This region will be referred to as an "obscurable section"). The photodarkenable material or component is a material which reacts to radiation of the wavelength used to read the disc, such as the quantum dot, amorphous semiconductor, silver soap and other materials discussed above. In this embodiment, the active concentration or other parameter of the material or component are such that the time constant for optical reaction is significantly increased over that for the previously described embodiment. Accordingly, while routine reads of the relevant area will not quickly induce a darkening or other reaction, sustained exposure to infrared radiation will cause an optical change in the irradiated region, shown by regions 304 and 304' in FIGS. 5b and 5c respectively. Thus, a particular area is altered by directing the read laser at the area for a prolonged period, typically two seconds or less, depending upon the exact parameters of the chosen photodarkenable material or component.

Figure 5A:
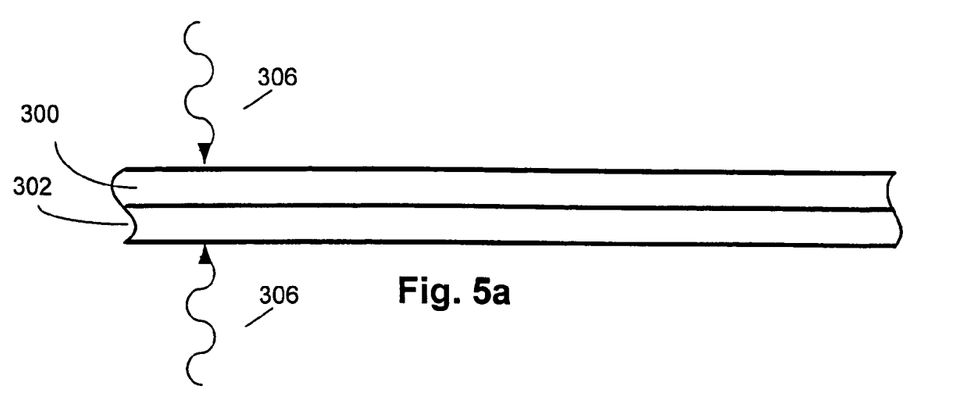
FIG. 5a is a simplified sectional side view of the obscurable section of a disc according to an embodiment of the present invention, taken along a radius of the disc, wherein the disc has not yet been read by a user machine.
Figure 5B:
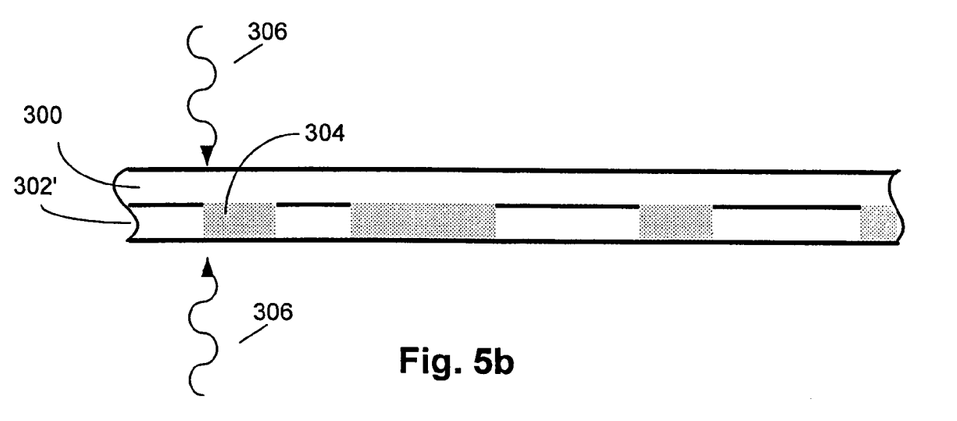
FIG. 5b is a sectional side view of the obscurable section of a disc according to an embodiment of the present invention, taken along a radius of the disc, wherein the disc has been previously read by a user machine.
Figure 5C:
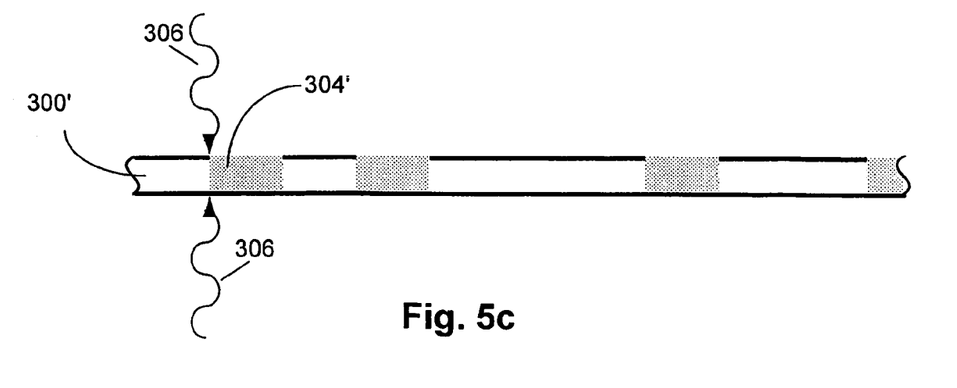
FIG. 5c is a sectional side view of the obscurable section of a disc according to another embodiment of the present invention, taken along a radius of the disc, wherein the disc has been previously read by a user machine.

The exposure time to induce an optical change is preferably longer than the cumulative exposure via routine reads over the expected lifetime of the product, to avoid the alteration of encoded data by repeated reading. This said, short exposure times, such as those experienced during a read, are not necessarily strictly cumulative, due to the absence of significant heat build-up and other effects associated with longer exposure times. Thus, for example, if one second of exposure is required to produce an optical alteration, it does not necessarily follow that 1000 separate one-millisecond read exposures will likewise produce the alteration. Rather, significantly more reads would generally be required to produce such an alteration depending upon the material chosen. Radiation 306 emanating from the read laser is shown for illustration purposes as impinging the disc from both directions. Typically, however, the read laser radiation will initially strike the disc from only one direction, which depends upon the system and disc design. Although this embodiment is described with reference to a photodarkenable mask material, other mask materials, such as non-reflective mask materials that are photoreactive to become reflective, may also be used.

A pattern of such optically altered regions is used in this embodiment to encode information onto the disc, in that for example altered areas may be read as a "1" while unaltered areas in the region are registered as "0," or transitions between altered and unaltered areas within the obscurable section may be read as data. Thus, the disc is writable using the same radiation ordinarily used to read the information on the disc. The particular area of the disc that is written using this method may be as small as a pit or plane, or as larger as, or larger than, a sector or ring of the disc.

Figure 6:
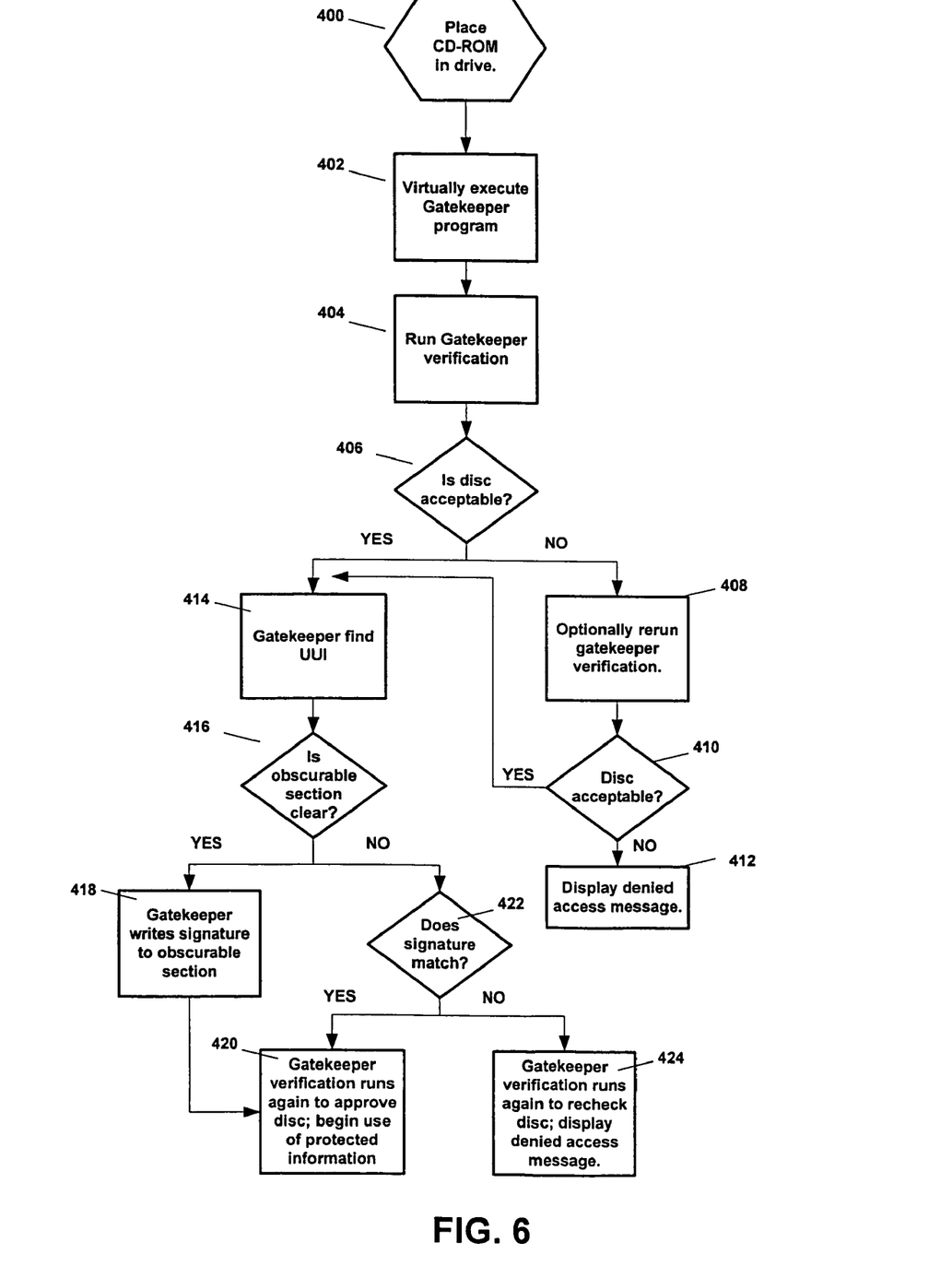
FIG. 6 depicts a flow chart representing the process used to grant or deny access to the information stored on a CD-ROM in an alternative embodiment of the present invention.

A disc according to an embodiment of the invention is produced without having a password or hidden code information encoded thereon, but having thereon a gatekeeper program and an obscurable section as described above. The security function provided by such a disc in this embodiment of the invention is shown in FIG. 6. While the system is described with reference to a CD-ROM and CD-ROM drive, it will be understood by those of skill in the art that the described mechanisms and techniques are more widely applicable to other optical storage media as well. Initially at event 400, the CD-ROM is placed into the CD-ROM drive. In step 402, the gatekeeper program resident on the disc is executed virtually from the CD-ROM.

The gatekeeper program may alternatively be loaded onto a computer or other device and run thereon. In step 404, a gatekeeper verification program, which may be a subpart of the gatekeeper program, is run to confirm, in a manner well-known to those of skill in the art, that the disc is neither faulty nor being hacked. At decision 406, if the disc is determined by the verification program to be unacceptable to run, then in step 408, the gatekeeper verification program may optionally be repeated one or more times. If the disc remains unacceptable, then at decision 410 the gatekeeper verification program informs the user that the disc is unacceptable in step 412, and may present an explanation of the detected fault or problem as well as a phone number, email address, Internet address, etc. for inquiries and/or ordering information.

Continuing with reference to FIG. 6, if at decision 410, or at decision 406, the disc is determined to be acceptable, then the gatekeeper program locates user unique information ("UUI") in step 414. This information is gathered from the user machine itself, possibly including such information as chip and/or component serial numbers, resident program serial numbers or identifiers, etc. Any information that is detectable and that can be used to attempt to uniquely identify the machine, either alone or in combination with other information is UUI that may be used to create a user machine "signature," which may the UUI itself or a value derived therefrom. For example, one or more chip serial numbers may be gathered and combined or concatenated in a manner to produce a password or code, the signature, that is unlikely to be reproduced for a different machine. The length of the signature produced should be chosen to be writable on the disc using the space allotted within a reasonable amount of time using the particular encoding method and material chosen.

In decision 416, the gatekeeper program locates the obscurable section and determines whether it is clear, i.e. whether or not it has been written to. If the obscurable section is clear, then in step 418, the gatekeeper program writes the signature to the section as described above, as shown in FIG. 6. There are many different ways in which the signature can be written to the obscurable section, depending in part on the size and composition of the obscurable section; for example, the obscurable section may comprise a large or small portion of the disc area, and may be contiguous or fragmented. If the signature is to be written on the level of pits and plains, then the signature may comprise a substantial amount of data, such as a simple listing of chip identities and serial numbers. If, on the other hand, the granularity of writing is to be less, so that writing occurs on the level of a disc sector or ring, the signature will generally comprise a lesser amount of data. For example, one thousand separate sectors could represent one thousand different signature conditions. Sector 5648 could then be obscured to represent a signature of 5648, and so on, according to the particular algorithm chosen to encode the signature.

More efficiently, each obscured sector or ring from a select group of such (i.e., the obscurable section), can be used to encode a binary digit, so that all or some of the select group could be written to encode a binary string. Using this method, a thousand-condition signature is writable in an obscurable section having only ten writable units, be they sectors or rings. This method, while more efficient in its use of disc space, exacts a greater cost in terms of writing time. One benefit to writing user machine unique information on the disc itself, as opposed to storing disc unique information on the user machine, is that if the user machine loses its stored information, such as through a hard drive crash or otherwise, the machine, once recovered, can still use a disc which had previously been signed using that machine's UUI.

Subsequently in step 420 of FIG. 6, the gatekeeper program runs again, approving the disc for use, and grants the machine access to the protected disc contents, such as by installing the title program from the disc to the user machine.

If at decision 416 it is determined that the obscurable section is not clear, i.e. that it has been written, then in decision 422 the gatekeeper program reads the signature from the obscurable section (the "existing signature") and compares it to a signature derived from the UUI collected in step 412 (the "generated signature"). Since the gatekeeper uses the same algorithm, whether it is writing a signature or just checking a previously written signature, then the existing signature and generated signature will match if the user machine is the same one that wrote the existing signature to the obscurable section. Thus, if the signatures match, then in step 420, the gatekeeper runs the verification program again and approves the disc for use. If however, the signatures are determined at decision 422 to not match, then in step 424, the gatekeeper may recheck the signatures before disapproving the disc for use and optionally presenting a screen of options as in step 412.

It may be desirable to provide a conditional signature. For example, the signature may consist of a listing of twelve serial numbers, and a match may be found when at least eight of the twelve match. Thus, using such a signature and condition, a user could replace several components of his computer and still have a user machine signature that allows usage of a previously used signed disc of the type described above.

In order to best utilize a signaturized disc as described above, it will in some cases be necessary to enhance the disc drive read protocol as well. In general, large areas of a CD-ROM that contain no data, such as an unwritten obscurable section, may be detected as an "error" by some CD-ROM drives. Accordingly, it is desirable to configure the CD-ROM read protocol to designate such areas, when detected in the region of the obscurable section, as a series of zeroes, for example. Alternatively, certain CD-ROM drives will detect certain disc regions as all zeroes regardless of the content of those areas. Accordingly, if the obscurable section is to be in such an area, then it is desirable to alter the read protocol to detect any change in such an area as a "1."

Figure 7:
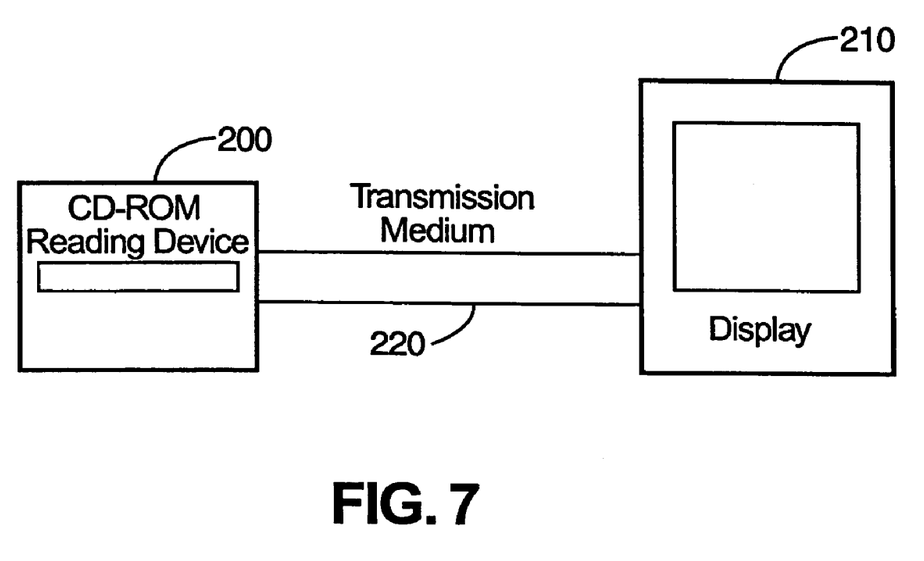
FIG. 7 is a schematic illustration of an exemplary system in which the memory of the present invention may be used.

In one embodiment, the information protected on the CD-ROM is text information, such as the text of a novel, treatise, or periodical. In this embodiment, the CD-ROM is adapted to be used in a device that can read the information and display it or otherwise convey it to the user, once access to the disc is granted. FIG. 7 depicts a variation of this embodiment in which the device 200 which reads the CD-ROM may be physically separate from the means 210 for displaying or otherwise conveying the information read. In this variation, necessary information could be exchanged between the reading means and displaying or conveying means by way of permanent or temporary hardwire, optical, radio transmission, or other means 220. Such information may be, for example, display, control, or formatting information.

In another preferred embodiment, the gatekeeper program is the same regardless of the contents of the disc.

In a further embodiment, the writing mechanism described above for signaturizing a CD-ROM may be used more generally to place other kinds of information onto the disc via the read laser. For example, a user's program settings or options could be written onto a non-secure disc containing the program so that the user does not have to repeat the information upon using the disc on a different machine. Those of skill in the art will appreciate that any other type of information could be written to the disc in this manner as well. In this embodiment, the obscurable section may, but need not, comprise a large portion of the entire usable data area of the disc.

Figure 8:
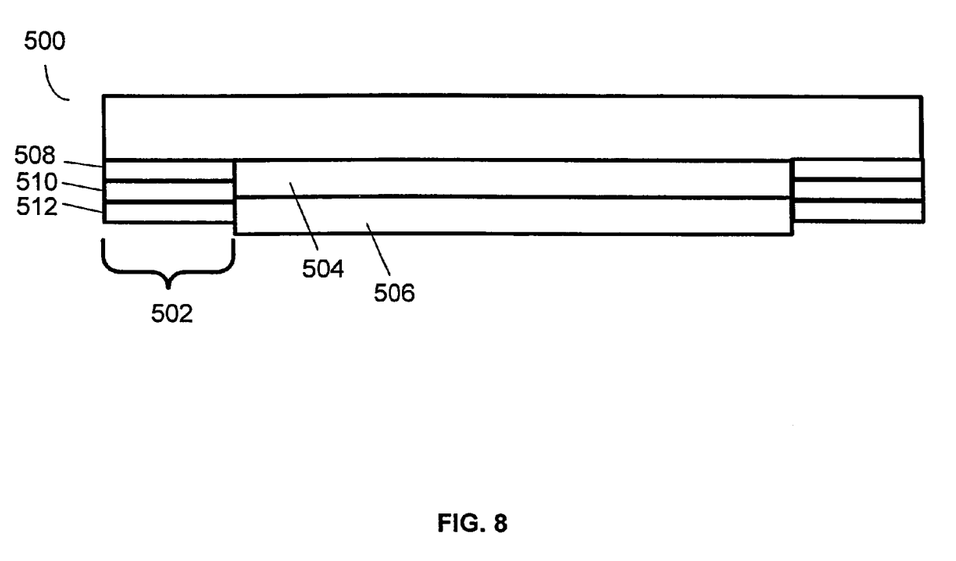
FIG. 8 is a sectional side view of a disc according to an embodiment of the present invention, taken along a radius of the disc.

An alternative embodiment of a suitable disc structure is illustrated schematically in FIG. 8. In particular, the disc 500 is originally processed in a largely conventional manner, with the exception that an outer ring 502 of the disc 500 is protected so that aluminum 504 and lacquer 506 are not initially deposited in the protected region 502. Subsequently, a photoreactive mask layer 508 is deposited on the protected ring 502, followed by a deposition of aluminum 510 or other reflectant, and the application of a protective lacquer 512. In this embodiment, because the mask layer 508 does not cover any part of the disc 500 other than the obscurable section, it need not be initially clear. For example, the mask layer 508 may actually comprise an initially opaque or reflective material which is photoreactive to become reflective or non-reflective respectively. In such a case, there need not be a separate reflective layer 510 adjacent the mask layer.

Deposition of the disc layers within the protected ring 502 may be by way of a reverse masking process, or may alternatively be by way of spin coating such that centrifugal force limits deposition to an outer portion. It may be desirable to use a combination of these techniques by themselves, or in conjunction with other coating techniques. The width of the protected region 502 in this embodiment is preferably approximately 0.125 inches, but may be much less or much greater than that depending upon a user's preference or constraints.

While the invention has been described with reference to certain exemplary embodiments, there is no intent to limit it to those embodiments. To the contrary, it is recognized that various changes and modifications to the specifically described embodiments will be apparent to those skilled in the art, and that such changes may be made without departing from the spirit and scope of the invention.

For example, the photosensitive mask layer or constituent material may react indirectly to the heat caused by laser radiation rather than directly to the photons or light energy itself. A layer of the disc itself, rather than a mask layer, may be altered by the read laser radiation, energy, or heat. As well, the invention may be embodied in optically readable memory technology other than CD-ROM's. Examples of such other technology include the digital video disc (DVD), Laser Disc, CD-R, and minidisc, and there will likely be developed other optically readable memory systems with which the present invention could be used. It is also recognized that the embodiments of the invention may be used with optical memory technology that operates by transmittance rather than reflectance. It is not critical which side of the disc the mask layer is located upon, as this may be determined in part by the direction from which the optical radiation impinges upon the disc, or the disc manufacturing steps used. Thus, the read laser radiation may or may not pass through the disc substrate depending upon whether the disc is read by transmission or reflection, and in the case of reflection, whether the read laser radiation impinges from the information side or otherwise.

Further, there may be more than one vanishing code on a memory, or a vanishing code may be dispersed piecemeal at different locations on the memory. It is also within the scope of an embodiment of this invention to use a mask layer whose time-constant properties allow reading by a number of machines greater than one before the vanishing code becomes unreadable.

One of skill in the art will appreciate that although the user unique information described in an embodiment of the invention is derived from serial numbers and other numerically stored indicators, it may also be derived from a machine-unique measured value, such as wavelength or power factors of the read laser and so on.

Accordingly, such changes, modifications, and equivalents are intended to be covered by the appended claims and equivalents thereof.

What is claimed is:

1. A method of securely providing user information to a user machine adapted to operate in conjunction with an optically readable memory containing information which comprises at least the user information and a gatekeeper program, and having thereon an obscurable section comprising a photoreactive mask layer disposed to alter the detected optical properties of areas of the memory exposed substantially to a wavelength of optical radiation usable to read the memory, the method comprising the steps of:

collecting machine-unique information from the user machine;
  generating a user machine signature based on the machine-unique information;
  causing the user machine to scan the obscurable section of the memory;
  determining whether an existing signature is present in the obscurable section; and
  if no existing signature is present in the obscurable section, causing the generated user machine signature to be written in the obscurable section by selectively irradiating the obscurable section with light of the same wavelength used to read the memory, thereby selectively altering the detected optical properties of the memory in the obscurable section, and
  providing the user information to the user machine; and
  if an existing signature is present in the obscurable section, causing the user machine to compare the existing signature to the generated signature, and
  providing the user information to the user machine if the existing signature matches the generated signature, and denying the user machine access to the user information if the existing signature does not match the generated signature.

2. The method of claim 1, wherein the step of collecting machine-unique information form the user machine is performed by the gatekeeper program.

3. The method according to claim 1, wherein the machine-unique information includes component-identifying information corresponding to at least one hardware component residing in the user machine.

4. The method according to claim 3, wherein the machine-unique information includes component-identifying information corresponding to a plurality of hardware components residing in the user machine, and wherein the step of comparing the existing signature to the generated signature includes the step of finding a match if a subset of the component-identifying information used to derive the generated signature matches a subset of the component-identifying information used to derive the existing signature.

5. The method according to claim 1, wherein the photoreactive mask layer includes UV chromophores pre-exposed to UV radiation, such that the photoreactive mask layer is sensitized to IR radiation of the wavelength used to read the memory.

6. The method according to claim 5, wherein the UV chromophores are disposed on a surface of the optically readable memory.

7. The method according to claim 5, wherein the UV chromophores are disposed within a layer of the optically readable memory.

8. The method according to claim 1, wherein the photoreactive mask layer includes silver soap.

9. The method according to claim 8, wherein the silver soap is disposed on the surface of the optically readable memory.

10. The method according to claim 8, wherein the silver soap is disposed within a layer of the optically readable memory.

11. The method according to claim 1, wherein the photoreactive mask layer includes amorphous compound semiconductor material.

12. The method according to claim 11, wherein the amorphous compound semiconductor material is disposed on the surface of the optically readable memory.

13. The method according to claim 11, wherein the amorphous compound semiconductor material is disposed within a layer of the optically readable memory.

14. The method according to claim 1, wherein the photoreactive mask layer includes oxygen bearing material disposed within a reflective layer of the memory, adapted to release oxygen into the material of the reflective layer upon encountering IR radiation.

15. The method according to claim 1, wherein the step of causing the generated user machine signature to be written in the obscurable section by selectively irradiating the obscurable section further comprises the step of irradiating the obscurable section with a wavelength of light such that the resolution is on the order of individual lands and pits to encode the user machine signature.

16. The method of claim 1, wherein the step of causing the generated user machine signature to be written in the obscurable section by selectively irradiating the obscurable section further comprises the step of irradiating an individual ring of the optical memory to encode the user machine signature.

17. The method according to claim 16, wherein the step of irradiating an individual ring of optical memory to encode the user machine signature comprises the step of irradiating a subset of a plurality of rings within the obscurable section to encode a binary representation of the signature.

18. The method according to claim 1, wherein the step of causing the generated user machine signature to be written in the obscurable section by selectively irradiating the obscurable section further comprises the step of irradiating individual sectors of the optical memory to encode the user machine signature.

19. The method according to claim 1, wherein the obscurable section consists of a ring along an outer circumference of the disc surface, and wherein the photoreactive mask layer is disposed only in the obscurable section.

20. The method according to claim 1, wherein the altered detected optical properties of the memory in the obscurable section exhibit a change in the reflectively of the mask layer.

21. The method according to claim 1, wherein the altered detected optical properties of the memory in the obscurable section exhibit a change in the translucence of the mask layer.

* * * * *